United States Patent [19]

Kosal et al.

[11] Patent Number: 4,625,011

[45] Date of Patent: Nov. 25, 1986

[54] NEUTRALIZATION OF ALKALI METAL CATALYSTS IN ORGANOPOLYSILOXANES

[75] Inventors: Diane M. Kosal; Myron T. Maxson, both of Midland, Mich.

[73] Assignee: Dow Corning Corporation, Midland, Mich.

[21] Appl. No.: 530,296

[22] Filed: Sep. 8, 1983

Related U.S. Application Data

[63] Continuation-in-part of Ser. No. 504,635, Jun. 15, 1983, abandoned.

[51] Int. Cl.[4] .............................................. C08G 77/06
[52] U.S. Cl. ..................................... 528/14; 556/462; 528/18; 528/32; 528/33; 528/37
[58] Field of Search ...................... 528/14, 18, 32, 33, 528/37; 556/462

[56] References Cited

U.S. PATENT DOCUMENTS 2,571,533 10/1951 Britton et al. .......................... 528/33
3,453,304 7/1969 Selin ...................................... 528/14
3,694,405 9/1972 Litteral ................................. 528/32
3,903,047 9/1975 Ashby ................................... 528/32
3,939,195 2/1976 Lücking et al. ....................... 528/32

*Primary Examiner*—Melvyn I. Marquis
*Attorney, Agent, or Firm*—Robert L. McKellar

[57] ABSTRACT

A process for the neutralization of the alkali metal catalyst in a polymerized organopolysiloxane where the alkali metal content of the resulting organopolysiloxane is significantly reduced, is described. The process consists of neutralizing the alkali metal salt with a straight-chain carboxylic acid of general formula ZCOOH, where Z is a hydrocarbon group containing at least two carbon atoms, and thereafter filtering the organopolysiloxane. The same ZCOOH carboxylic acids may be added to organopolysiloxanes which have previously been neutralized with either carbon dioxide or acetic acid in order to significantly reduce the alkali metal content of the organopolysiloxane after filtration. Organopolysiloxanes containing less than 0.5 ppm $K^+$ can be easily obtained.

43 Claims, No Drawings

NEUTRALIZATION OF ALKALI METAL CATALYSTS IN ORGANOPOLYSILOXANES

BACKGROUND OF THE INVENTION

This application is a continuation-in-part of application Ser. No. 504,635 filed June 15, 1983, now abandoned.

The present invention relates to a method of neutralizing alkali metal catalysts in organopolysiloxanes where the alkali metal content of the resulting organopolysiloxane is substantially reduced. More particularly, the present invention relates to a method of neutralizing alkali metal catalysts in organopolysiloxane with either a straight-chain organic carboxylic acid of general formula ZCOOH where Z is a hydrocarbon group containing at least two carbon atoms or with cyclohexane carboxylic acid and thereafter filtering the neutralized organopolysiloxane to substantially reduce the alkali metal content of the resulting organopolysiloxane.

It is well known in the organopolysiloxane art to cause polymerization of relatively low molecular weight organopolysiloxanes to relatively high molecular weight organopolysiloxanes by an alkali metal catalyzed polymerization. Many of the commercially available organopolysiloxane fluids are prepared by this method using potassium hydroxide or potassium silanolate as the basic catalyst. However, it is recognized that the use of alkali metal catalysts results in a product which is not chemically stable. Thus, when an alkali metal polymerized organopolysiloxane fluid is allowed to stand in a moist atmosphere at temperatures as low as room temperature, moisture reacts with the alkali metal catalyst remaining in the organopolysiloxane to cause degradation of the product to a lower molecular weight state. When these same alkali metal polymerized organopolysiloxanes are heated to temperatures of the order of 100° to 250° C., this same type of degradation takes place at an accelerated rate. Residual alkali metals in organopolysiloxanes used in electrical or electronic applications are especially troublesome. Therefore, there is a definite need in the organopolysiloxane art to provide organopolysiloxanes with very low residual alkali metal levels.

Numerous methods have been proposed in the prior art for neutralizing the alkali metal catalyst after polymerization. One such method is to remove the catalyst from the organopolysiloxane after polymerization by washing. This washing is effected with fluid organopolysiloxanes by neutralizing the alkali metal catalyst with acetic acid and extracting the alkali metal acetate formed with water. Disadvantages of this method of removing the alkali metal catalyst are that the extraction process is time consuming and it is difficult to remove all of the acetate from the fluid.

U.S. Pat. No. 3,481,898 (issued Dec. 2, 1969) teaches that the basic polymerization catalyst can be neutralized by adding solid carbon dioxide to the polymerized organopolysiloxane. However, despite the utmost precaution in washing or neutralizing with these methods, it is often difficult to remove the last traces of the alkali metal compound. Even if effective neutralization is accomplished, washing of the neutralized product will often fail to remove all traces of the salts resulting from the neutralization, so that at elevated temperatures there may occur decomposition of the neutral salt to give residues which can exert a depolymerizing or degrading effect on the organopolysiloxane.

Another method for neutralizing the alkali metal catalyst in polyorganosiloxanes is the method described in U.S. Pat. No. 2,739,952 (issued Mar. 27, 1956) which employs certain organophorphous compounds added to the polymerized organopolysiloxane. Elemental iodine has been used to neutralize the alkali metal catalyst in polyorganosiloxanes as taught in U.S. Pat. No. 2,789,109 (issued Apr. 16, 1957). Both bromoalkanes (U.S. Pat. No. 3,153,007 issued Oct. 13, 1964) and alpha chlorohydrin (U.S. Pat. No. 3,065,203 issued Nov. 20, 1962) have also been employed to neutralize the basic catalyst in polyorganosiloxane polymerizations. Silyl phosphates have been employed in the continuous neutralization of the alkali metal catalyst in the equilibration of siloxanes as described in U.S. Pat. Nos. 4,177,200 (issued Dec. 4, 1979) and 4,250,290 (issued Feb. 10, 1981).

All of the methods of the prior art suffer from various disadvantages. These disadvantages include toxicity of the neutralization agent or neutralization product, difficulty in carrying out the neutralization method on a large, commercial scale, and failure to reduce the alkali metal content to low levels in the neutralized organopolysiloxane product.

It is one object of the present invention to provide a method for the simple and effective neutralization of the alkali metal catalyst polymerized organopolysiloxane and removal of the alkali metal from the polymerized organopolysiloxane. Another object of this invention is to provide an organopolysiloxane which has a alkali metal content which is substantially reduced from the initial alkali metal level. Another object is to provide a polymerized organopolysiloxane with an alkali metal content of less than 2 parts per million (ppm), or preferably less than 0.5 ppm. Still another object is to provide an organopolysiloxane which is especially useful in electric and electronic applications. Still another object is to provide a method for substantially reducing the alkali metal content of a polymerized organopolysiloxane which had previously been neutralized with either carbon dioxide or acetic acid. Still other objects of this invention will be apparent from a consideration of the instant specification.

SUMMARY OF THE INVENTION

This invention relates to a process for neutralizing an alkali metal catalyst in an alkali metal catalyst polymerized organopolysiloxane, where said polymerized organopolysiloxane has a viscosity of 10 to 500,000 centipoises at 25° C., which process comprises (1) intimately contacting said polymerized organopolysiloxane with an effective amount of an organic carboxylic acid of general formula ZCOOH where Z is a hydrocarbon group containing at least two carbon atoms and where said organic carboxylic acid is selected from the group consisting of straight-chain organic carboxylic acids and cyclohexane carboxylic acid, and (2) filtering the product of step (1) in order to reduce the alkali metal content of said polymerized organopolysiloxane.

This invention also relates to a process of manufacturing relatively high molecular weight organopolysiloxanes with a viscosity of 10 to 500,000 centipoises at 25° C. by polymerization of relatively low molecular weight organopolysiloxanes in the presence of an alkali metal catalyst including the step of neutralizing the alkali metal catalyst subsequent to polymerization wherein the improvement comprises using an effective amount of an organic carboxylic acid to neutralize the alkali metal catalyst subsequent to polymerization when said organic carboxylic acid is of general formula ZCOOH where Z is an hydrocarbon radical containing at least two carbon atoms and where the organic carboxylic acid is selected from the group consisting of straight-chain organic carboxylic acids and cyclohexane carboxylic acid and thereafter filtering the neutralized relatively high molecular weight organopolysiloxane in order to reduce the alkali metal content of the relatively high molecular weight organopolysiloxane.

This invention also relates to a process for reducing the alkali metal content of an alkali metal catalyst polymerized and neutralized organopolysiloxane, where said polymerized and neutralized organopolysiloxane has been initially neutralized with either carbon dioxide or acetic acid, and where said polymerized and neutralized organopolysiloxane has a viscosity of 10 to 500,000 centipoises at 25° C., which process comprises (1) intimately contacting said polymerized and neutralized organopolysiloxane with an effective amount of an organic carboxylic acid of general formula ZCOOH where Z is a hydrocarbon group containing at least two carbon atoms and where said organic carboxylic acid is selected from the group consisting of straight-chain organic carboxylic acids and cyclohexane carboxylic acid, and (2) filtering the product of step (1) in order to reduce the alkali metal content of said polymerized and neutralized organopolysiloxane.

The organopolysiloxanes which may be treated by the method of this invention are fluid organopolysiloxanes with a viscosity of about 10 to 500,000 centipoises at 25° C. The fluid organopolysiloxane may contain $R_3SiO_{\frac{1}{2}}$, $R_2SiO$, $RSiO_{3/2}$ and $SiO_2$ units where R is hydrogen or a monovalent hydrocarbon radical or a halogenated monovalent hydrocarbon radical. More specifically, R can be, for example, hydrogen, any alkyl radical such as the methyl, ethyl, isopropyl, tert-butyl, 2-ethylhexyl, dodecyl, octadecyl and myricyl radicals; any alkenyl radical such as the vinyl, allyl, decenyl and hexadienyl radicals; and cycloalkyl radical such as the cyclopentyl and cyclohexyl radicals; and cycloalkenyl radical such as the cyclopentenyl, cyclohexenyl and cyclo-2,4-hexadienyl radicals; any aryl radical such as the phenyl, naphthyl and xenyl radicals; any aralkyl radical such as the benzyl, phenylethyl and xylyl radicals and any alkaryl radicals such as the tolyl and dimethylphenyl radicals. These monovalent hydrocarbon radicals can be halogenated to give such radicals as the chloromethyl, 3,3,3-trifluoropropyl, 3,3,4,4,5,5,5-heptafluoropentyl, perchlorophenyl, 3,4-dibromocyclohexyl, α,α,α-trifluorotolyl, 2,4-dibromobenzyl, difluoromonochlorovinyl, α,β,β-trifluoro-α-chlorocyclobutyl and 2-iodocyclopenten-3-yl radicals, all of which are operative. Naturally, mixtures of various different R groups may be present in the organopolysiloxanes. Preferred R groups include the monovalent hydrocarbon radicals containing 1 to 4 carbon atoms, vinyl, phenyl, and 3,3,3-trifluoropropyl radicals. In general, these fluid organopolysiloxanes may be described as having the general formula

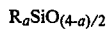

$$R_aSiO_{(4-a)/2}$$

where a has a value from about 1.9 to 2.2 and R is an organic radical as described above. Preferred organopolysiloxanes which may be treated by the method of this invention have values of a in the range of 1.95 to 2.01 inclusive in the above formula.

Especially preferred fluid organopolysiloxanes which may be treated by the method of this invention are described in U.S. Pat. No. 4,374,967 (issued Feb. 22, 1983) which is hereby incorporated by reference in its entirety. These especially preferred fluid organopolysiloxanes consist essentially of 80 to 96.5 mol percent of $(CH_3)_2SiO$ units, 2.0 to 10.0 mol percent of $CH_3SiO_{3/2}$ units, 1.25 to 6.0 mol percent of $(CH_3)_3SiO_{\frac{1}{2}}$ units, and 0.25 to 4.0 mol percent of $(CH_3)_2(CH_2=CH)SiO_{\frac{1}{2}}$ units. Even more especially preferred fluid organopolysiloxanes consist essentially of 87 to 94 mol percent of $(CH_3)_2SiO$ units, 3 to 6 mol percent of $CH_3SiO_{3/2}$ units, 2.5 to 5.0 mol percent of $(CH_3)_3SiO_{\frac{1}{2}}$ units, and 0.5 to 2.0 mol percent of $(CH_3)_2(CH_2=CH)SiO_{\frac{1}{2}}$ units. These especially preferred fluid organopolysiloxanes can be employed in a low temperature dielectric gel as described in U.S. Pat. No. 4,374,967. Since organopolysiloxanes prepared by the method of this invention contain only trace amounts of the alkali metal from the catalyst, they are especially useful in such electrical or electronic applications.

The term "alkali metal catalyst" as employed in this specification is intended to mean basic siloxane rearranging and polymerization catalysts containing an alkali metal atom or ion, which are used in the preparation of various higher molecular weight organopolysiloxanes from lower molecular weight organopolysiloxanes or mixtures of lower molecular weight organopolysiloxanes. Examples of such alkali metal catalysts include the alkali metal hydroxides (e.g. lithium hydroxide, potassium hydroxide, sodium hydroxide, or cesium hydroxide) or the low molecular weight silanolate salts of these hydroxides (e.g. $KOSi(CH_3)_2OSi(CH_3)_2OK$ or $(CH_3)_3SiONa$). These alkali metal silanolates are more fully described in, for example, U.S. Pat. Nos. 2,567,110 (issued Sept. 4, 1951) and 2,587,636 (issued Mar. 4, 1952). The main requisite for the alkali metal catalyst is that it is sufficiently alkaline or basic to effect the desired siloxane rearrangement and polymerization of the various organopolysiloxanes at a temperature on the order of about 80° to 200° C. Accordingly, the term "alkali metal catalyst" is not intended to be limited to the specific types or examples of the catalysts described above, but rather is intended to include these as well as other basic alkali metal catalysts capable of acting in the same fashion. Preferred alkali metal catalysts are potassium silanolate and potassium hydroxide.

The organic carboxylic acids employed in this invention are selected from the group consisting of straight-chain organic carboxylic acids of general formula ZCOOH where Z is a hydrocarbon group which contains at least two carbon atoms and cyclohexane carboxylic acid. Both saturated and unsaturated carboxylic acids may be employed. Examples of suitable organic carboxylic acids include propionic acid, butyric acid, valeric acid, caproic acid, caprylic acid, capric acid, lauric acid, myristic acid, palmitic acid, stearic acid, undecylenic acid, and oleic acid. Preferred carboxylic acids for use in this invention include the straight-chain organic carboxylic acids of general formula ZCOOH where Z is a hydrocarbon group containing 2 to 21, inclusive, carbon atoms and cyclohexane carboxylic acid. It is also preferred that the carboxylic acid employed be soluble in low molecular weight siloxanes such as, for example, octamethylcyclotetrasiloxane or mixed cyclics $(R_2SiO)_x$. Such a carboxylic acid, dissolved in such low molecular weight siloxanes, can be more easily added and mixed with the organopolysiloxanes to be neutralized. Specific preferred carboxylic acids include propionic acid, oleic acid, undecylenic acid and cyclohexane carboxylic acid with propionic acid being most preferred. In general, the branched organic carboxylic acids, e.g. 2-ethylhexanoic acid, are not suitable for use in the present invention.

In the practice of this invention an effective amount of the desired carboxylic acid is added to the polymerized organopolysiloxane in a manner to insure neutralization of the alkali metal catalyst by the carboxylic acid. The carboxylic acid is added only after the organopolysiloxane has reached the desired degree of polymerization since addition of the carboxylic acid neutralizes the basic catalyst and prevents further base catalyzed polymerization. By "effective amount" of the carboxylic acid it is meant an amount of carboxylic acid in excess of about 80 weight percent of the stoichiometric equivalent of the alkali metal catalyst used in preparing the organopolysiloxane. It is preferred that the carboxylic acid be added at about 100 to 150 weight percent of the stoichiometric equivalent of the alkali metal catalyst. The carboxylic acid may be added at even higher levels although this would not serve any additional purpose.

The alkali metal catalyst in the polymerized organopolysiloxane is neutralized by intimately contacting the alkali metal catalyst with the organic carboxylic acid. By "intimately contacting" it is meant that the carboxylic acid is thoroughly mixed with the polymerized organopolysiloxane. It is desirable, therefore, to thoroughly agitate the polymerized organopolysiloxane with means known in the art such as stirring or static mixing. It is also preferred, as discussed earlier, that the carboxylic acid be added in a solution of low molecular weight siloxanes to facilitate mixing. The temperature at which the neutralization takes place will normally be, for convenience sake, the temperature of the polymerization reaction which is normally less than about 200° C. The neutralization temperature is preferably about 100°–175° C. and most preferably about 150°–175° C. Naturally, other neutralization temperatures may be employed.

After neutralization is complete, the neutralized organopolysiloxane is filtered to remove the alkali metal salt of the added carboxylic acid. Normally filter aids should be employed to increase the filtration efficiency. These filter aids are well known in the art. Examples of such filter aids include diatomaceous earth, asbestos, purified wood cellulose, silica, or other inert porous solids. The filter aid may also be used to pre-coat the filter if desired. The actual filtration equipment is not critical but a plate-and-frame press would be preferred in a commercial operation. Naturally, other types of filters such as shell-and-leaf filters, cartridge filters, vacuum filters, pressure filters, centrifugal filters or rotary-drum filters may be employed. In some instances several passes through the filter medium or passage through several filters may be advantageous in reducing the alkali metal content of the filtered organopolysiloxane to the desired level. In actual operation the filtration configuration is best determined by experimentation.

Usually, the organopolysiloxanes are devolatilized by standard procedures, i.e. heating at from about 100° C. to 250° C. in circulating air or a vacuum, until the unreactive low molecular weight siloxanes are removed. The devolatilization step can be accomplished either after neutralization but before filtration or after filtration. Normally, it is preferred that the devolatilization step be carried out after the filtration step. If volatile carboxylic acids are used in the neutralization, any excess (over that required to neutralized the basic catalyst) may be removed along with the low molecular weight siloxanes in the devolatilization step. If the low molecular weight siloxanes containing excess carboxylic acid are recycled to the initial polymerization step then extra basic catalyst may be required since the recycled carboxylic acid will neutralize an equivalent amount of the basic catalyst before the desired polymerization can take place. Excess carboxylic acid should be removed from organopolysiloxane fluids to be used in electronic or electrical applications. Failure to remove any excess carboxylic acid does not adversely effect the organopolysiloxane fluid which is intended for other applications.

The carboxylic acids of general formula ZCOOH, where Z is a hydrocarbon group containing at least two carbon atoms, may also be used to reduce the alkali metal content of alkali metal catalyst polymerized organopolysiloxane which have already been neutralized with either acetic acid or carbon dioxide. This procedure can be used to reduce the alkali metal content of a polymerized and neutralized organopolysiloxane containing either alkali metal carbonate or alkali metal acetate, formed by neutralization from either carbon dioxide or acetic acid, respectively, in a simple and effective process. The ZCOOH carboxylic acid is intimately contacted with the polymerized and neutralized organopolysiloxane containing either alkali metal carbonate or acetate. The treated product is then filtered in order to reduce the alkali metal content of the organopolysiloxane. The same organopolysiloxanes, the same ZCOOH carboxylic acids, and the same procedures as detailed elsewhere in this specification may be employed in the practice of this invention to reduce the alkali metal content of organopolysiloxanes previously neutralized with either carbon dioxide or acetic acid. When treating organopolysiloxane which have previously been neutralized with either carbon dioxide or acetic acid, "effective amount" of the ZCOOH means an amount of the carboxylic acid in excess of about 80 percent of the stoichiometric equivalent of the alkali metal carbonate or alkali metal acetate present in the organopolysiloxane.

The organopolysiloxane fluids prepared from the method of this invention have substantially reduced levels of alkali metal atoms or ions as compared with the same materials neutralized with the prior art procedures. Organopolysiloxanes containing less than 2 ppm alkali metal atoms or ions can be easily obtained. With more effective filtration organopolysiloxanes containing less than 0.5 ppm alkali metal can be prepared. Such materials are especially useful in electrical or electronic applications.

Although applicants do not wish to be limited by theory, they believe that the success of the present method is due, at least in part, to the fact that the alkali metal carboxylate salt crystals formed in the present invention are larger in size than those formed by the prior art neutralization procedures. Such larger crystals can be removed to a greater extent by filtration.

The process of the present invention can be carried out in a batch, semi-continuous or continuous basis.

The effectiveness of the present invention is illustrated in the following examples.

EXAMPLE 1

A linear polydimethylsiloxane was prepared by heating a mixture consisting of 267 g of $[(CH_3)_2SiO]_x$ cyclics where x is 4 to 6 and 12.8 g of $(CH_3)_2(CH_2=CH)Si-O[(CH_3)_2SiO]_nSi(CH=CH_2)(CH_3)_2$ where n is 0–12 with an average value of about 6 to a temperature of 150° C., under nitrogen, for about 2.3 hours in the presence of a basic alkali metal catalyst. The basic alkali metal catalyst employed was potassium silanolate (KO—Si≡—) with a neutralization equivalent of about 1347 g. The potassium silanolate was present at a level of about 114 ppm $K^+$ in the above described mixture. After the 2.3 hours of heating, various neutralization agents were added to neutralize the basic alkali metal catalyst and stop the polymerization. In one sample, $CO_2$ was bubbled through the mixture for twenty minutes. In the second sample, about 0.091 g propionic acid was added with mixing. The mixing was continued for twenty minutes. The amount of added propionic acid corresponds to a 50 percent theoretical excess based on the amount of potassium present. Both neutralization agents were added at a temperature of 150° C. at which time the heat was turned off and the mixtures allowed to cool slowly. Twenty minutes after addition of the neutralization agents, 14 g Hyflo Super-Cel filter aid (Manville Corporation, Denver, Colo.) was added to each sample. Stirring was continued 45 minutes after which each sample was individually filtered through a paper and cloth filter at about 40° C. The paper used as the filter medium was a 50 pound weight paper of grade 127/026; the cloth was number 10 duck canvas grade 123/70. Both the paper and cloth were obtained from Great Lakes Filter Medium Sales, Detroit, Mich. Each sample was given two passes through the pressure filter which was operated at 40 psi. The level of $K^+$ in the filtrate was determined after each pass through the filter. The $K^+$ concentration was determined by flame photometry as described in A. L. Smith (Ed.), *Analysis of Silicones*, John Wiley and Sons, New York (1974), page 356. The detection limit was 0.5 ppm $K^+$. Using $CO_2$ as the neutralization agent, the filtrate after the first filtration pass contained 70 ppm $K^+$; the filtrate after the second pass contained 61 ppm $K^+$. Using propionic acid as the neutralization agent, the filtrate after the first filtration contained 9.8 ppm $K^+$; the filtrate after the second filtration contained less than 0.5 ppm $K^+$. In both samples the filtrate was a dimethylvinylsiloxy endblocked dimethylpolysiloxane with a viscosity of about 450 cs at 25° C. and a vinyl content of about 0.36 weight percent.

EXAMPLE 2

A mixture containing 103 g of a three component fluid consisting of 25 weight percent $CH_3SiO_{3/2}$ units, 71 weight percent $(CH_3)_2SiO$ units, and 4 weight percent $(CH_3)_3SiO_{\frac{1}{2}}$ units, 19.3 g of $(CH_3)_2(CH_2=CH)Si-O[(CH_3)_2SiO]_nSi(CH=CH_2)(CH_3)_2$ where n is 0–12 with an average value of 6, 72.6 g of $(CH_3)_3SiO[(CH_3)_2SiO]_mSi(CH_3)_3$ (viscosity of 10 cs at 25° C.) where m has an average value of 13–14, 405 g of $[(CH_3)_2SiO]_x$ cyclics where x is 4 to 6, and 2.4 g of a potassium silanolate catalyst was heated to 165° C. for about 2.5 hours in a closed system. The potassium silanolate catalyst employed had a neutralization equivalent of about 1347 g and was present in such amounts so as to give a mixture containing about 114 ppm $K^+$. After completion of the 2.5 hours of heating, varying amounts of propionic acid were added to neutralize the basic catalyst and to stop the polymerization. The propionic acid was added in the form of a 12.5 weight percent solution in $[(CH_3)_2SiO]_x$ cyclics where x is 4–6. The propionic acid solution was added at 165° C. The neutralized mixture was mixed for 30 minutes after which time the mixture was vacuum stripped at 170° C. for 15 minutes. After 14 percent weight loss was noted upon stripping or devolatilization. Filter aids consisting of 10 g Dialose 6-E and 5 g Celaton FW-80 (both from Eagle-Pitcher Industries, Inc., Cincinnati, Ohio) were added to the mixture at 70° C. and stirred for an additional 30 minutes. Samples (40° C.) were then filtered through a paper and cloth filter as described in Example 1. Again, each sample was given two passes through the filter.

In Run 1, the amount of propionic acid added in the neutralization step was 80 weight percent of the theoretical amount required to neutralize all the potassium silanolate catalyst. In Run 2, the amount of propionic acid added was 100 weight percent of the same theoretical amount. In Run 3, the amount of propionic acid added was 150 weight percent of the same theoretical amount. The results obtained are presented in the following Table.

| Run | Acid Amount | $K^+$ (ppm) in Filtrate first pass | $K^+$ (ppm) in Filtrate second pass | Final Product acid Number | Final Product viscosity, (cs) at 25° C. |
|---|---|---|---|---|---|
| 1 | 80% | 6.2 | 0.9 | 0.0056 | 550 |
| 2 | 100% | 32 | <0.5 | 0.0056 | 514 |
| 3 | 150% | 28 | <0.5 | 0.0056 | 501 |

EXAMPLE 3

Several polymerizations were carried out using the same starting materials and procedures as outlined in Example 2. After completion of the polymerization different neutralizing agents were added to the polymer. The amount of neutralization agent added was 150 percent by weight of that required to neutralize all of the potassium catalyst.

The unfiltered, neutralized polymer was examined by electron microscope to determine the average potassium carboxylate salt crystal size. The following results were obtained:

| Neutralization Agent | Average Crystal Size |
|---|---|
| carbon dioxide | 0.6 microns |
| acetic acid | 1.5 microns |
| propionic acid | 10.0 microns |
| oleic acid | 1.8 microns |
| undecylenic acid | 2.5 microns |
| cyclohexane carboxylic acid | 3.0 microns |

Based on this data it is clear that the potassium salt should be removed more easily upon filtration using propanic acid, oleic acid, undecylenic acid, or cyclohexane carboxylic acid as the neutralization agent as opposed to the prior art carbon dioxide or acetic acid neutralization agents. It is also easy to see that propionic acid is the preferred neutralization agent.

EXAMPLE 4

In this example an organopolysiloxane similar to that described in Example 2 was prepared in a continuous plant type process. All raw materials were fed into the polymerization reactor by separate pumps. A mixture (5:1 by volume) of [(CH$_3$)$_2$SiO]$_x$ cyclics where x is 4 to 6 and a three component fluid consisting of 25 weight percent CH$_3$SiO$_{3/2}$ units, 71 weight percent (CH$_3$)$_2$SiO units, and 4 weight percent (CH$_3$)$_3$SiO$_{\frac{1}{2}}$ units was pumped into the reactor at a flowrate of about 500 cc/hr. Other raw materials included (CH$_3$)$_2$(CH$_2$=CH)SiO[(CH$_3$)$_2$SiO]$_n$-Si(CH=CH$_2$)(CH$_3$)$_2$ where n has an average value of 6, which was pumped into the reactor at a flowrate of about 20.5 cc/hr; (CH$_3$)$_3$SiO[(CH$_3$)$_2$SiO]$_m$Si(CH$_3$)$_3$ where m has an average value of 13-14 which was pumped into the reactor at a rate of about 50 cc/hr; and potassium silanolate catalyst (3 weight percent in [(CH$_3$)$_2$SiO]$_x$ cyclics, x is 4 to 6) at a flowrate of about 13.2 cc/hr. The potassium silanolate catalyst had a neutralization equivalent of about 1347 g and was present in such amounts that the mixture in the polymerization reactor contained about 18 ppm K$^+$. The raw materials were preheated to about 170° C. before entering the polymerization reactor. The polymerization reactor was a plug flow type and consisted of three tubes in series. The reactor tubes were constructed of glass and each had a diameter of about 1.5 inches and a length of 30 inches. The reactor was kept at about 175°-185° C. and a pressure of 5 psi. The residence time in the reactor was about 2.5 hours. The desired neutralization agent was injected into the organopolysiloxane stream as it exited the polymerization reactor. The amount of added neutralization agent was 150 weight percent of that required to neutralize all of the potassium catalyst. After the neutralization agent was added, the resulting mixture was pumped into a glass column (diameter, 0.75 inch; length, 30 inches) containing saddles which was designed to simulate a static mixer. The neutralization column was kept at about 160° C. The residence time in the mixing or neutralization column was about 5 minutes. After the mixing column, the organopolysiloxane was stripped at 175° C. under vacuum and the neutralized organopolysiloxane collected. Approximately two hours after neutralization, the organopolysiloxane was filtered at 40° C. through a paper and cloth filter using the same filter aids and procedures as described in Example 2. Samples were filtered twice and the potassium level was determined in the filtered organopolysiloxane after each filtration.

The first neutralization agent used was carbon dioxide gas which was employed for about nine hours. Then the neutralization agent was switched to a 1.25 weight percent solution of acetic acid in mixed cyclics [(CH$_3$)$_2$SiO]$_x$. The acetic acid was employed for two hours. Finally, a 1.25 weight percent solution of propionic acid in mixed cyclics [(CH$_3$)$_2$SiO]$_x$ was employed as the neutralization agent. The reaction was continued for about 2.5 hours. Samples for potassium analysis were taken for each neutralization agent after the previous neutralization products had ample time to be flushed from the system. The following results were obtained. The unfiltered organopolysiloxane had about 18 ppm K$^+$.

| Neutralization Agent | K$^+$ (ppm) in Filtrate | | Organopolysiloxane Viscosity (cs) at 25° C. |
|---|---|---|---|
| | First Pass | Second Pass | |
| CO$_2$ | 8.5 | 6.0 | 478 |
| CH$_3$COOH | 4.6 | 5.4 | 461 |
| CH$_3$CH$_2$COOH | 1.3 | <0.5 | 489 |

EXAMPLE 5

This example illustrates the reduction of the alkali metal content of an organopolysiloxane which was initially neutralized with carbon dioxide. A mixture containing [(CH$_3$)$_2$SiO]$_x$ cyclics where x is 4 to 6 and the three component fluid described in Example 1, in a 5/1 weight ratio, was fed into a preheater at 170° C. at a rate of 200 pounds/hour. From the preheater this cyclics/three component fluid mixture was contacted with (CH$_3$)$_2$(CH$_2$=CH)SiO[(CH$_3$)$_2$SiO]$_n$-Si(CH=CH$_2$)(CH$_3$)$_2$ where n is 0-12 with an average value of 6 which was fed at a rate of 3800 cc/hr, potassium silanolate which was 25 weight percent in [(CH$_3$)$_2$SiO]$_x$ cyclics, x about 4 to 6, which was introduced at a rate of 2200 cc/hr, and (CH$_3$)$_3$SiO[(CH$_3$)$_2$SiO]$_m$Si(CH$_3$)$_3$, m has an average value of 13-14, which was fed at a rate of about 8500 cc/hr. The combined mixture was fed into a three column plug-flow reactor at 170° C. The residence time in the reactor was 2.5 hours. The reaction product was neutralized by bubbling carbon dioxide (20 cc/hr) through the product at 160° C. for about 20 minutes. After being pumped through a static mixer, the product was stripped at 170° C. and 25 mm mercury pressure. After the addition of a filter aid (Hyflo Super-Cel) the product was filtered through a plate and frame pressure filter. The polymer from this process contained 52 ppm K$^+$.

A sample (300 g) of the above prepared polymer was placed in a 500 ml three neck flask equipped with a stirrer, condenser, and thermometer. The polymer was heated to 70° C. with stirring at which time individual carboxylic acid were added. After stirring for about 30 minutes, the mixture was cooled to room temperature. The cooled polymer/carboxylic acid mixture was placed in a jar to which was added about 10 g of Hyflo Super-Cel filter aid and the jar was placed on a drum roller for 30 minutes. The mixture was filtered twice through a paper and cloth pressure filter as described in Example 1. The potassium content was determined after each filter pass.

The carboxylic acids used were acetic acid (as a control), propionic acid, oleic acid, and cyclohexane carboxylic acid.

| Acid | Percent Excess**** | K$^+$ (ppm) in filtrate | |
|---|---|---|---|
| | | first pass | second pass |
| None* | — | 12 | 4.7 |
| Acetic** | 50 | 1.7 | 0.9 |
| Proponic*** | 50 | <0.5 | <0.5 |
| Oleic | 400 | <0.5 | <0.5 |
| Cyclohexane carboxylic | 100 | <0.5 | <0.5 |

*Control. The CO$_2$ neutralized product was subjected to the described procedure except that no carboxylic acid was added.
**Comparative example.
***This example used another polymer which was prepared in exactly the same manner as described but which contained 45 ppm K$^+$ before the treatment with propionic acid.
****The amount of carboxylic acid in excess of that required to react with the K$^+$ in the form of potassium carbonate.

From these results it can clearly be seen that treatment of a organopolysiloxane, that had previously been neutralized with carbon dioxide, with a carboxylic acid of formula ZCOOH where Z contains at least two carbon atoms can substantially lower the alkali metal content of the organopolysiloxane.

That which is claimed is:

1. A process for neutralizing an alkali metal catalyst in an alkali metal catalyst polymerized organopolysiloxane, where said polymerized organopolysiloxane has a viscosity of 10 to 500,000 centipoises at 25° C., which process comprises (1) intimately contacting said polymerized organopolysiloxane with an effective amount of an organic carboxylic acid of general formula ZCOOH where Z is a hydrocarbon group containing at least two carbon atoms and where said organic carboxylic acid is selected from the group consisting of straight-chain organic carboxylic acids and cyclohexane carboxylic acid, and (2) filtering the product of step (1) in order to reduce the alkali metal content of said polymerized organopolysiloxane.

2. A process as defined in claim 1 wherein, in said organic carboxylic acid of general formula ZCOOH, Z contains from 2 to 21 carbon atoms inclusive.

3. A process as defined in claim 2 wherein said organic carboxylic acid is selected from the group consisting of propionic acid, oleic acid, undecylenic acid and cyclohexane carboxylic acid.

4. A process as defined in claim 3 wherein said organic carboxylic acid is propionic acid.

5. A process as defined in claim 2 wherein said polymerized organopolysiloxane has a general formula $R_aSiO_{(4-a)/2}$
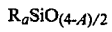

where a has a value of about 1.9 to 2.2 and R is a hydrogen atom or a monovalent hydrocarbon radical or a halogenated monovalent hydrocarbon radical and wherein said alkali metal catalyst is selected from the group consisting of alkali metal hydroxides and alkali metal silanolates.

6. A process as defined in claim 3 wherein said polymerized organopolysiloxane has a general formula $R_aSiO_{(4-a)/2}$
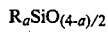

where a has a value of about 1.9 to 2.2 and R is a hydrogen atom or a monovalent hydrocarbon radical or a halogenated monovalent hydrocarbon radical and wherein said alkali metal catalyst is selected from the group consisting of alkali metal hydroxides and alkali metal silanolates.

7. A process as defined in claim 4 wherein said polymerized organopolysiloxane has a general formula $R_aSiO_{(4-a)/2}$
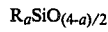

where a has a value of about 1.9 to 2.2 and R is a hydrogen atom or a monovalent hydrocarbon radical or a halogenated monovalent hydrocarbon radical and wherein said alkali metal catalyst is selected from the group consisting of alkali metal hydroxides and alkali metal silanolates.

8. A process as defined in claim 5 wherein said polymerized organopolysiloxane consists essentially of 80 to 96.5 mol percent of $(CH_3)_2SiO$ units, 2.0 to 10.0 mol percent of $CH_3SiO_{3/2}$ units, 1.25 to 6.0 mol percent of $(CH_3)_3SiO_{\frac{1}{2}}$ units, and 0.25 to 4.0 mol percent of $(CH_3)_2(CH_2=CH)SiO_{\frac{1}{2}}$ units.

9. A process as defined in claim 6 wherein said polymerized organopolysiloxane consists essentially of 80 to 96.5 mol percent of $(CH_3)_2SiO$ units, 2.0 to 10.0 mol percent of $CH_3SiO_{3/2}$ units, 1.25 to 6.0 mol percent of $(CH_3)_3SiO_{\frac{1}{2}}$ units, and 0.25 to 4.0 mol percent of $(CH_3)_2(CH_2=CH)SiO_{\frac{1}{2}}$ units.

10. A process as defined in claim 7 wherein said polymerized organopolysiloxane consists essentially of 80 to 96.5 mol percent of $(CH_3)_2SiO$ units, 2.0 to 10.0 mol percent of $CH_3SiO_{3/2}$ units, 1.25 to 6.0 mol percent of $(CH_3)_3SiO_{\frac{1}{2}}$ units, and 0.25 to 4.0 mol percent of $(CH_3)_2(CH_2=CH)SiO_{\frac{1}{2}}$ units.

11. A process as defined in claim 8 wherein said polymerized organopolysiloxane consists essentially of 87 to 94 mol percent of $(CH_3)_2SiO$ units, 3 to 6 mol percent of $CH_3SiO_{3/2}$ units, 2.5 to 5.0 mol percent of $(CH_3)_3SiO_{\frac{1}{2}}$ units, and 0.5 to 2.0 mol percent of $(CH_3)_2(CH_2=CH)SiO_{\frac{1}{2}}$ units.

12. A process as defined in claim 9 wherein said polymerized organopolysiloxane consists essentially of 87 to 94 mol percent of $(CH_3)_2SiO$ units, 3 to 6 mol percent of $CH_3SiO_{3/2}$ units, 2.5 to 5.0 mol percent of $(CH_3)_3SiO_{\frac{1}{2}}$ units, and 0.5 to 2.0 mol percent of $(CH_3)_2(CH_2=CH)SiO_{\frac{1}{2}}$ units.
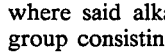

13. A process as defined in claim 10 wherein said polymerized organopolysiloxane consists essentially of 87 to 94 mol percent of $(CH_3)_2SiO$ units, 3 to 6 mol percent of $CH_3SiO_{3/2}$ units, 2.5 to 5.0 mol percent of $(CH_3)_3SiO_{\frac{1}{2}}$ units, and 0.5 to 2.0 mol percent of $(CH_3)_2(CH_2=CH)SiO_{\frac{1}{2}}$ units.

14. A process for neutralizing an alkali metal catalyst in an alkali metal catalyst polymerized organopolysiloxane, where said polymerized organopolysiloxane has a viscosity of 10 to 500,000 centipoises at 25° C., where said polymerized organopolysiloxane has a general formula $R_aSiO_{(4-a)/2}$ where a has a value of about 1.9 to 2.2 and R is a hydrogen atom or a monovalent hydrocarbon radical or a halogenated monovalent hydrocarbon radical, and where said alkali metal catalyst is selected from the group consisting of alkali metal hydroxides and alkali metal silanolates, which process comprises (1) intimately contacting said polymerized organopolysiloxane with an effective amount of an organic carboxylic acid at a temperature of less than 200° C. where said organic carboxylic acid is of general formula ZCOOH where Z is a hydrocarbon group containing from 2 to 21 carbon atoms inclusive and where said organic carboxylic acid is selected from the group consisting of straight-chain organic carboxylic acids and cyclohexane carboxylic acid, and (2) filtering the product of step (1) in order to reduce the alkali metal content of said polymerized organopolysiloxane.

15. A process as defined in claim 14 wherein in said polymerized organopolysiloxane of general formula $R_aSiO_{(4-a)/2}$

a has a value of 1.95 to 2.01 inclusive and R is selected from the group consisting of monovalent hydrocarbon radicals containing 1 to 4 carbon atoms, vinyl, phenyl or trifluoropropyl radicals, and wherein said alkali metal catalyst is potassium hydroxide or potassium silanolate, where said organic carboxylic acid is selected from the group consisting of propionic acid, oleic acid, undecylenic acid and cyclohexane carboxylic acid and where said polymerized organopolysiloxane is intimately contacted with said organic carboxylic acid at a temperature of 100° 175° C.

16. A process as defined in claim 15 wherein said polymerized organopolysiloxane consists essentially of 80 to 96.5 mol percent of $(CH_3)_2SiO$ units, 2.0 to 10.0 mol percent of $CH_2SiO_{3/2}$ units, 1.25 to 6.0 mol percent of $(CH_3)_3SiO_{\frac{1}{2}}$ units, and 0.25 to 4.0 mol percent of $(CH_3)_2(CH_2=CH)SiO_{\frac{1}{2}}$ units.

17. A process as defined in claim 16 wherein said polymerized organopolysiloxane consists essentially of 87 to 94 mol percent of $(CH_3)_2SiO$ units, 3 to 6 mol percent of $CH_3SiO_{3/2}$ units, 2.5 to 5.0 mol percent of $(CH_3)_3SiO_{\frac{1}{2}}$ units, and 0.5 to 2.0 mol percent of $(CH_3)_2(CH_2=CH)SiO_{\frac{1}{2}}$ units.

18. A process as defined in claim 15 wherein said alkali metal catalyst is potassium silanolate and said organic carboxylic acid is propionic acid and wherein said organic carboxylic acid is present in an amount stoichiometrically equivalent to 100 to 150 weight percent of the alkali metal catalyst.

19. A process as defined in claim 17 wherein said alkali metal catalyst is potassium silanolate and said organic carboxylic acid is propionic acid and wherein said organic carboxylic acid is present in an amount stoichiometrically equivalent to 100 to 150 weight percent of the alkali metal catalyst.

20. A polymerized organopolysiloxane as prepared by the method of claim 16 wherein the alkali metal content of said polymerized organopolysiloxane after completion of step (2) is less than 0.5 part per million.

21. A polymerized organopolysiloxane as prepared by the method of claim 17 wherein the alkali metal content of said polymerized organopolysiloxane after completion of step (2) is less than 0.5 part per million.

22. A polymerized organopolysiloxane as prepared by the method of claim 19 wherein the alkali metal content of said polymerized organopolysiloxane after completion of step (2) is less than 0.5 part per million.

23. In a process of manufacturing relatively high molecular weight organopolysiloxanes with a viscosity of 10 to 500,000 centipoises at 25° C. by polymerization of relatively low molecular weight organopolysiloxanes in the presence of an alkali metal catalyst including the step of neutralizing the alkali metal catalyst subsequent to polymerization, the improvement comprising using an effective amount of an organic carboxylic acid to neutralize the alkali metal catalyst subsequent to polymerization when said organic carboxylic acid is of general formula ZCOOH where Z is a hydrocarbon radical containing at least two carbon atoms and where the organic carboxylic acid is selected from the group consisting of straight-chain organic carboxylic acids and cyclohexane carboxylic acid and thereafter filtering the neutralized relatively high molecular weight organopolysiloxane in order to reduce the alkali metal content of the relatively high molecular weight organopolysiloxane.

24. A process as defined in claim 23 wherein said relatively high molecular weight organopolysiloxane has a general formula $$R_aSiO_{(4-a)/2}$$

where a has a value of about 1.9 to 2.2 and R is a hydrogen atom or a monovalent hydrocarbon radical or a halogenated monovalent hydrocarbon radical and wherein said alkali metal catalyst is selected from the group consisting of alkali metal hydroxides and alkali metal silanolates, wherein said alkali metal catalyst is neutralized at a temperature of less than 200° C., and wherein, in said organic carboxylic acid of general formula ZCOOH, Z is a hydrocarbon group containing from 2 to 21 carbon atoms inclusive.

25. A process as defined in claim 24 wherein said relatively high molecular weight organopolysiloxane consists essentially of 87 to 94 mol percent of $(CH_3)_2SiO$ units, 3 to 6 mol percent of $CH_3SiO_{3/2}$ units, 2.5 to 5.0 mol percent of $(CH_3)_3SiO_{\frac{1}{2}}$ units, and 0.5 to 2.0 mol percent of $(CH_3)_2(CH_2=CH)SiO_{\frac{1}{2}}$ units.

26. A process as defined in claim 24 wherein said alkali metal catalyst is potassium silanolate and said organic carboxylic acid is propionic acid.

27. A process as defined in claim 25 wherein said alkali metal catalyst is potassium silanolate and said organic carboxylic acid is propionic acid.

28. A process for reducing the alkali metal content of an alkali metal catalyst polymerized and neutralized organopolysiloxane, where said polymerized and neutralized organopolysiloxane has been initially neutralized with either carbon dioxide or acetic acid and where said polymerized and neutralized organopolysiloxane has a viscosity of 10 to 500,000 centipoises at 25° C., which process comprises (1) intimately contacting said polymerized and neutralized organopolysiloxane with an effective amount of an organic carboxylic acid of general formula ZCOOH where Z is a hydrocarbon group containing at least two carbon atoms and where said organic carboxylic acid is selected from the group consisting of straight-chain organic carboxylic acids and cyclohexane carboxylic acid, and (2) filtering the product of step (1) in order to reduce the alkali metal content of said polymerized and neutralized organopolysiloxane.

29. A process as defined in claim 28 wherein, in said organic carboxylic acid of general formula ZCOOH, Z contains from 2 to 21 carbon atoms inclusive.

30. A process as defined in claim 29 wherein said organic carboxylic acid is selected from the group consisting of propionic acid, oleic acid, undecylenic acid and cyclohexane carboxylic acid.

31. A process as defined in claim 30 wherein said organic carboxylic acid is propionic acid.

32. A process as defined in claim 29 wherein said polymerized and neutralized organopolysiloxane has a general formula $$R_aSiO_{(4-a)/2}$$

where a has a value of about 1.9 to 2.2 and R is a hydrogen atom or a monovalent hydrocarbon radical or a halogenated monovalent hydrocarbon radical and wherein said alkali metal catalyst is selected from the group consisting of alkali metal hydroxides and alkali metal silanolates.

33. A process as defined in claim 30 wherein said polymerized and neutralized organopolysiloxane has a general formula $$R_aSiO_{(4-a)/2}$$

where a has a value of about 1.9 to 2.2 and R is a hydrogen atom or a monovalent hydrocarbon radical or a halogenated monovalent hydrocarbon radical and wherein said alkali metal catalyst is selected from the group consisting of alkali metal hydroxides and alkali metal silanolates.

34. A process as defined in claim 31 wherein said polymerized and neutralized organopolysiloxane has a general formula

$$R_aSiO_{(4-a)/2}$$

where a has a value of about 1.9 to 2.2 and R is a hydrogen atom or a monovalent hydrocarbon radical or a halogenated monovalent hydrocarbon radical and wherein said alkali metal catalyst is selected from the group consisting of alkali metal hydroxides and alkali metal silanolates.

35. A process as defined in claim 32 wherein said polymerized and neutralized organopolysiloxane consists essentially of 80 to 96.5 mol percent of $(CH_3)_2SiO$ units, 2.0 to 10.0 mol percent of $CH_3SiO_{3/2}$ units, 1.25 to 6.0 mol percent of $(CH_3)_3SiO_{\frac{1}{2}}$ units, and 0.25 to 4.0 mol percent of $(CH_3)_2(CH_2=CH)SiO_{\frac{1}{2}}$ units.

36. A process as defined in claim 33 wherein said polymerized and neutralized organopolysiloxane consists essentially of 80 to 96.5 mol percent of $(CH_3)_2SiO$ units, 2.0 to 10.0 mol percent of $CH_3SiO_{3/2}$ units, 1.25 to 6.0 mol percent of $(CH_3)_3SiO_{\frac{1}{2}}$ units, and 0.25 to 4.0 mol percent of $(CH_3)_2(CH_2=CH)SiO_{\frac{1}{2}}$ units.

37. A process as defined in claim 34 wherein said polymerized and neutralized organopolysiloxane consists essentially of 80 to 96.5 mol percent of $(CH_3)_2SiO$ units, 2.0 to 10.0 mol percent of $CH_3SiO_{3/2}$ units, 1.25 to 6.0 mol percent of $(CH_3)_3SiO_{\frac{1}{2}}$ units, and 0.25 to 4.0 mol percent of $(CH_3)_2(CH_2=CH)SiO_{\frac{1}{2}}$ units.

38. A process as defined in claim 35 wherein said polymerized and neutralized organopolysiloxane has been initially neutralized with carbon dioxide and wherein said polymerized and neutralized organopolysiloxane consists essentially of 87 to 94 mol percent of $(CH_3)_2SiO$ units, 3 to 6 mol percent of $CH_3SiO_{3/2}$ units, 2.5 to 5.0 mol percent of $(CH_3)_3SiO_{\frac{1}{2}}$ units, and 0.5 to 2.0 mol percent of $(CH_3)_2(CH_2=CH)SiO_{\frac{1}{2}}$ units.

39. A process as defined in claim 35 wherein said polymerized and neutralized organopolysiloxane has been initially neutralized with acetic acid and wherein said polymerized and neutralized organopolysiloxane consists essentially of 87 to 94 mol percent of $(CH_3)_2SiO$ units, 3 to 6 mol percent of $CH_3SiO_{3/2}$ units, 2.5 to 5.0 mol percent of $(CH_3)_3SiO_{\frac{1}{2}}$ units, and 0.5 to 2.0 mol percent of $(CH_3)_2(CH_2=CH)SiO_{\frac{1}{2}}$ units.

40. A process as defined in claim 36 wherein said polymerized and neutralized organopolysiloxane has been initially neutralized with carbon dioxide and wherein said polymerized and neutralized organopolysiloxane consists essentially of 87 to 94 mol percent of $(CH_3)_2SiO$ units, 3 to 6 mol percent of $CH_3SiO_{3/2}$ units, 2.5 to 5.0 mol percent of $(CH_3)_3SiO_{\frac{1}{2}}$ units, and 0.5 to 2.0 mol percent of $(CH_3)_2(CH_2=CH)SiO_{\frac{1}{2}}$ units.

41. A process as defined in claim 36 wherein said polymerized and neutralized organopolysiloxane has been initially neutralized with acetic acid and wherein said polymerized and neutralized organopolysiloxane consists essentially of 87 to 94 mol percent of $(CH_3)_2SiO$ units, 3 to 6 mol percent of $CH_3SiO_{3/2}$ units, 2.5 to 5.0 mol percent of $(CH_3)_3SiO_{\frac{1}{2}}$ units, and 0.5 to 2.0 mol percent of $(CH_3)_2(CH_2=CH)SiO_{\frac{1}{2}}$ units.

42. A process as defined in claim 37 wherein said polymerized and neutralized organopolysiloxane has been initially neutralized with carbon dioxide and wherein said polymerized and neutralized organopolysiloxane consists essentially of 87 to 94 mol percent of $(CH_3)_2SiO$ units, 3 to 6 mol percent of $CH_3SiO_{3/2}$ units, 2.5 to 5.0 mol percent of $(CH_3)_3SiO_{\frac{1}{2}}$ units, and 0.5 to 2.0 mol percent of $(CH_3)_2(CH_2=CH)SiO_{\frac{1}{2}}$ units.

43. A process as defined in claim 37 wherein said polymerized and neutralized organopolysiloxane has been initially neutralized with acetic acid and wherein said polymerized and neutralized organopolysiloxane consists essentially of 87 to 94 mol percent of $(CH_3)_2SiO$ units, 3 to 6 mol percent of $CH_3SiO_{3/2}$ units, 2.5 to 5.0 mol percent of $(CH_3)_3SiO_{\frac{1}{2}}$ units, and 0.5 to 2.0 mol percent of $(CH_3)_2(CH_2=CH)SiO_{\frac{1}{2}}$ units.

* * * * *